(12) United States Patent
Takaoka et al.

(10) Patent No.: US 6,338,243 B1
(45) Date of Patent: Jan. 15, 2002

(54) EXHAUST EMISSION CONTROL SYSTEM FOR INTERNAL COMBUSTION ENGINE

(75) Inventors: Nobuaki Takaoka; Toshikatsu Takanohashi, both of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/652,022

(22) Filed: Aug. 31, 2000

(30) Foreign Application Priority Data

Sep. 1, 1999 (JP) .......................................... 11-247973

(51) Int. Cl.⁷ ................................................ F01N 3/00
(52) U.S. Cl. .............................. 60/277; 60/276; 60/285
(58) Field of Search .......................... 60/277, 276, 285, 60/295, 297, 301

(56) References Cited

U.S. PATENT DOCUMENTS

| | | | | |
|---|---|---|---|---|
| 5,154,055 A | * | 10/1992 | Nakane et al. | 60/276 |
| 5,325,664 A | * | 7/1994 | Seki et al. | 60/276 |
| 5,448,887 A | * | 9/1995 | Takeshima | 60/278 |
| 5,568,725 A | * | 10/1996 | Uchikawa | 60/274 |
| 5,771,685 A | * | 6/1998 | Hepburn | 60/274 |
| 5,848,527 A | * | 12/1998 | Mitsutani | 60/274 |
| 6,138,453 A | * | 10/2000 | Sawada et al. | 60/277 |

FOREIGN PATENT DOCUMENTS

JP          11-93744        4/1999

* cited by examiner

*Primary Examiner*—Thomas Denion
*Assistant Examiner*—Binh Tran
(74) *Attorney, Agent, or Firm*—Arent Fox Kintner Plotkin & Kahn, PLLC

(57) ABSTRACT

An exhaust emission control system for a nitrogen oxide removing device, the control system having a first oxygen concentration sensor provided upstream of the nitrogen oxide removing device, a second oxygen concentration sensor provided downstream of the nitrogen oxide removing device. A first response delay time period from the time when the output value from the first oxygen concentration sensor has changed to a value indicative of a rich air-fuel ratio to the time when the output value from the second oxygen concentration sensor becomes a value indicative of a rich air-fuel ratio is measured. A second response delay time period from the time when the output value from the first oxygen concentration sensor has changed to a value indicative of a lean air-fuel ratio, to the time when the output value from the second oxygen concentration sensor becomes a value indicative of a lean air-fuel ratio is measured. Deterioration of the nitrogen oxide removing device is determined according to the first and second response delay time periods.

5 Claims, 7 Drawing Sheets

EXHAUST EMISSION CONTROL SYSTEM FOR INTERNAL COMBUSTION ENGINE

BACKGROUND OF THE INVENTION

The present invention relates to an exhaust emission control system for an internal combustion engine, and more particularly to an exhaust emission control system including a nitrogen oxide removing device for removing nitrogen oxides and for determining deterioration of the nitrogen oxide removing device.

In the case of setting the air-fuel ratio of an air-fuel mixture to be supplied to an internal combustion engine in a lean region with respect to a stoichiometric ratio (i.e., in the case of carrying out a so-called lean operation), the emission amount of nitrogen oxides (which will be hereinafter referred to as "NOx") tends to be increased. To cope with this, a known technique for exhaust emission control includes providing an NOx removing device containing an NOx absorbent for absorbing NOx in the exhaust system of the engine. The NOx absorbent has a characteristic that in the condition where the air-fuel ratio is set in a lean region with respect to the stoichiometric ratio and the oxygen concentration in exhaust gases is therefore relatively high (the amount of NOx is large) (this condition will be hereinafter referred to as "exhaust lean condition"), the NOx absorbent absorbs NOx, whereas in the condition where the air-fuel ratio is set in a rich region with respect to the stoichiometric ratio and the oxygen concentration in exhaust gases is therefore relatively low (this condition will be hereinafter referred to as "exhaust rich condition"), the NOx absorbent discharges the absorbed NOx. The NOx removing device containing this NOx absorbent is configured so that NOx discharged from the NOx absorbent in the exhaust rich condition is reduced by HC and CO and then exhausted as nitrogen gas, while HC and CO are oxidized and then exhausted as water vapor and carbon dioxide.

As emission control means, a three-way catalyst having oxidizing and reducing functions is also widely used, and an exhaust emission control system including such a three-way catalyst in addition to an NOx removing device is known in the art (e.g., Japanese Patent Laid-open No. Hei 11-93744). The three-way catalyst is arranged upstream of the NOx removing device in the exhaust system. This exhaust emission control system further includes two air-fuel ratio sensors respectively arranged upstream and downstream of the NOx removing device. In this exhaust emission control system, the deterioration of the NOx removing device is determined according to outputs from the two air-fuel ratio sensors when changing the air-fuel ratio from a lean air-fuel ratio to a rich air-fuel ratio or vice versa.

More specifically, when changing the air-fuel ratio from a lean air-fuel ratio to a rich air-fuel ratio or vice versa, the time period during which the output from each of the air-fuel ratio sensors arranged upstream and downstream of the NOx removing device retains a value corresponding to the stoichiometric ratio is measured, and the deterioration is then determined according to the time period measured above.

However, in the above conventional control system, variations in response characteristics of the air-fuel ratio sensors are not considered, so that the results of measurement change according to the response characteristics, causing a problem that the determination of deterioration becomes inaccurate in some cases. More specifically, in the above conventional control system, a time period RCU during which the output from the air-fuel ratio sensor provided upstream of the NOx removing device (downstream of the three-way catalyst) retains a value corresponding to the stoichiometric ratio and a time period RCD during which the output from the air-fuel ratio sensor provided downstream of the NOx removing device retains a value corresponding to the stoichiometric ratio are measured, and the deterioration of the NOx removing device is determined by a time difference TSTR=RCD−RCU. This time difference TSTR takes different values, for example, between in the case that the upstream air-fuel ratio sensor has a quick-response characteristic and the downstream air-fuel ratio sensor has a slow-response characteristic and in the case that the former has a slow-response characteristic and the latter has a quick-response characteristic. As a result, the accuracy of the determination of deterioration is reduced.

SUMMARY OF THE INVENTION

It is accordingly an object of the present invention to provide an exhaust emission control system which can determine the degree of deterioration of an NOx removing device more accurately than the prior art in the case of arranging sensors upstream and downstream of the NOx removing device.

The present invention provides an exhaust emission control system for an internal combustion engine, having nitrogen oxide removing means provided in an exhaust system of the internal combustion engine for absorbing nitrogen oxides contained in exhaust gases in an exhaust lean condition and reducing the absorbed nitrogen oxides in an exhaust rich condition. This control system is comprises a first oxygen concentration sensor provided upstream of the nitrogen oxide removing means for detecting the oxygen concentration in the exhaust gases; a second oxygen concentration sensor provided downstream of the nitrogen oxide removing means for detecting the oxygen concentration in the exhaust gases; first measuring means for measuring a first response delay time period from the time when the output value from the first oxygen concentration sensor has changed to a value indicative of a rich air-fuel ratio to the time when an output value from the second oxygen concentration sensor becomes a value indicative of a rich air-fuel ratio, after changing the air-fuel ratio of the air-fuel mixture to be supplied to the engine from a lean region to a rich region with respect to a stoichiometric ratio; second measuring means for measuring a second response delay time period from the time when the output value from the first oxygen concentration sensor has changed to a value indicative of a lean air-fuel ratio, to the time when the output value from the second oxygen concentration sensor becomes a value indicative of a lean air-fuel ratio, after changing the air-fuel ratio from the rich region to the lean region with respect to the stoichiometric ratio; and deterioration determining means for determining deterioration of the nitrogen oxide removing means according to the first and second response delay time periods.

With this arrangement, the first response delay time period from the time when the output value from the first oxygen concentration sensor has been changed to a value indicative of a rich air-fuel ratio to the time when the output value from the second oxygen concentration sensor becomes a value indicative of a rich air-fuel ratio is measured after changing the air-fuel ratio of an air-fuel mixture to be supplied to the engine from a lean region to a rich region with respect to the stoichiometric ratio. Further, the second response delay time period from the time when the output value from the first oxygen concentration sensor has been changed to a value indicative of a lean air-fuel ratio to the time when the output value from the second oxygen concentration sensor becomes a value indicative of a lean air-fuel ratio is measured after changing the air-fuel ratio from the rich region to the lean region with respect to the stoichiometric ratio. Then, the deterioration of the nitrogen oxide removing means is determined according to the first and second response delay time periods measured above. It is experimentally confirmed that the second response delay time period does not largely depend on whether or not the nitrogen oxide removing means is deteriorated, but reflects variations in characteristics of the oxygen concentration sensors. Accordingly, by using the second response delay time period with the first response delay time period reflecting the degree of deterioration of the nitrogen oxide removing means, the influence of variations in characteristics of the oxygen concentration sensors can be eliminated to allow more accurate determination of deterioration.

Preferably, the deterioration determining means includes correcting means for correcting the first response delay time period according to the second response delay time period, and determines the deterioration according to the first response delay time period corrected by the correcting means.

Preferably, the correcting means calculates a correction coefficient according to a change in the operating condition of the engine during the period from the time of measurement of the first response delay time period to the time of measurement of the second response delay time period, corrects the second response delay time period by using the correction coefficient, and corrects the first response delay time period by using the corrected second response delay time period.

Preferably, the exhaust emission control system further includes a three-way catalyst provided upstream of the first oxygen concentration sensor, and three-way catalyst deterioration determining means for determining deterioration of the three-way catalyst, wherein the deterioration determining means determines the deterioration of the nitrogen oxide removing means according to the first and second response delay time periods and the degree of deterioration of the three-way catalyst. In this case, the exhaust emission control system further includes a third oxygen concentration sensor provided upstream of the three-way catalyst, wherein the three-way catalyst deterioration determining means determines the degree of deterioration of the three-way catalyst according to an output value from the third oxygen concentration sensor and an output value from the first oxygen concentration sensor.

Preferably, the deterioration determining means calculates a first average value from a plurality of measured values of the first response delay time period and a second average value from a plurality of measured values of the second response delay time period, and determines the deterioration of the nitrogen oxide removing means according to the first and second average values.

Other objects and features of the invention will be more fully understood from the following detailed description and appended claims when taken with the accompanying drawings.

DETAILED DESCRIPTION OF THE PREFERRED EMBODIMENTS

Figure 1:
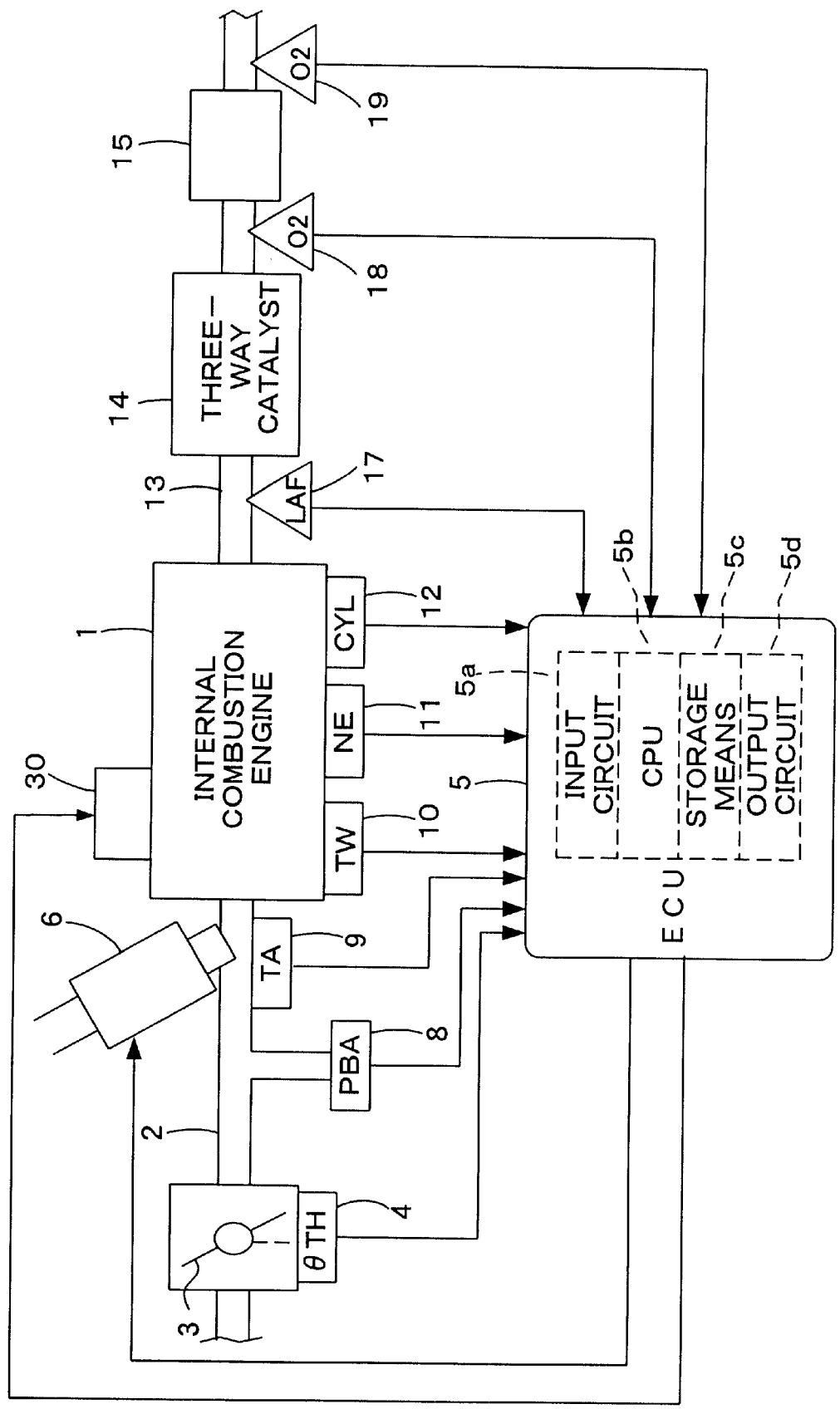
FIG. 1 is a schematic diagram showing the configuration of an internal combustion engine and a control system therefor according to a preferred embodiment of the present invention.

Referring to FIG. 1, there is schematically showing a general configuration of an internal combustion engine (which will be hereinafter referred to as an "engine") and a control system therefor, including an exhaust emission control system according to a preferred embodiment of the present invention. The engine is a four-cylinder engine 1, for example, and it has an intake pipe 2 provided with a throttle valve 3. A throttle valve opening (θTH) sensor 4 is connected to the throttle valve 3, so as to output an electrical signal corresponding to an opening angle of the throttle valve 3 and supply the electrical signal to an electronic control unit (which will be hereinafter referred to as "ECU") 5 for controlling the engine 1.

Fuel injection valves 6, only one of which is shown, are inserted into the intake pipe 2 at locations intermediate between the cylinder block of the engine 1 and the throttle valve 3 and slightly upstream of the respective intake valves (not shown). These fuel injection valves 6 are connected to a fuel pump (not shown), and electrically connected to the ECU 5. A valve opening period of each fuel injection valve 6 is controlled by a signal output from the ECU 5.

An absolute intake pressure (PBA) sensor 8 is provided immediately downstream of the throttle valve 3. An absolute pressure signal converted to an electrical signal by the absolute intake pressure sensor 8, is supplied to the ECU 5. An intake air temperature (TA) sensor 9 is provided downstream of the absolute intake pressure sensor 8 to detect an intake air temperature TA. An electrical signal corresponding to the detected intake air temperature TA, is outputted from the sensor 9 and supplied to the ECU 5.

An engine coolant temperature (TW) sensor 10 such as a thermistor is mounted on the body of the engine 1 to detect an engine coolant temperature (cooling water temperature) TW. A temperature signal corresponding to the detected engine coolant temperature TW is output from the sensor 10 and supplied to the ECU 5.

An engine rotational speed (NE) sensor 11 and a cylinder discrimination (CYL) sensor 12 are mounted in facing relation to a camshaft or a crankshaft (both not shown) of the engine 1. The engine rotational speed sensor 11 outputs a TDC signal pulse at a crank angle position located at a predetermined crank angle before the top dead center (TDC) corresponding to the start of an intake stroke of each cylinder of the engine 1 (at every 180° crank angle in the case of a four-cylinder engine). The cylinder discrimination sensor 12 outputs a cylinder discrimination signal pulse at a predetermined crank angle position for a specific cylinder of engine 1. These signal pulses output from the sensors 11 and 12 are supplied to the ECU 5.

An exhaust pipe 13 of the engine 1 is provided with a three-way catalyst 14 and an NOx removing device 15 as nitrogen oxide removing means arranged downstream of the three-way catalyst 14.

The three-way catalyst 14 has an oxygen storing capacity, and has the function of storing the oxygen contained in the exhaust gases in the exhaust lean condition where the air-fuel ratio of an air-fuel mixture to be supplied to the engine 1 is set in a lean region with respect to the stoichiometric ratio and the oxygen concentration in the exhaust gases is therefore relatively high. The three-way catalyst 14 has also the function of oxidizing HC and CO contained in the exhaust gases by using the stored oxygen in the exhaust rich condition where the air-fuel ratio of the air-fuel mixture to be supplied to the engine 1 is set in a rich region with respect to the stoichiometric ratio and the oxygen concentration in the exhaust gases is therefore low with a large proportion of HC and CO components.

The NOx removing device 15 includes an NOx absorbent for absorbing NOx and a catalyst for accelerating oxidation and reduction. As the NOx absorbent, a storage type absorbent or an adsorption type absorbent is used. The storage type absorbent stores NOx in the exhaust lean condition where the air-fuel ratio of the air-fuel mixture to be supplied to the engine 1 is set in a lean region with respect to the stoichiometric ratio and the oxygen concentration in the exhaust gases is therefore relatively high (the proportion of NOx is large), whereas it discharges the stored NOx in the exhaust rich condition where the air-fuel ratio of the air-fuel mixture to be supplied to the engine 1 is in the vicinity of the stoichiometric ratio or in a rich region with respect to the stoichiometric ratio and the oxygen concentration in the exhaust gases is therefore relatively low. On the other hand, the adsorption type absorbent adsorbs NOx in the exhaust lean condition and reduces NOx in the exhaust rich condition. In any case, the NOx absorbent in the NOx removing device 15 functions to absorb NOx in the exhaust lean condition and to discharge the absorbed NOx in the exhaust rich condition, thereby reducing the discharged NOx into nitrogen gas by HC and CO and oxidizing the HC and CO into water vapor and carbon dioxide. An example of the storage type NOx absorbent includes barium oxide (BaO), and examples of the adsorption type NOx absorbent include the combination of sodium (Na) and titanium (Ti) and the combination of strontium (Sr) and titanium (Ti). Further, examples of the catalyst in the NOx removing device 15 include noble metals such as rhodium (Rh), palladium (Pd), and platinum (Pt) both in the storage type and in the adsorption type.

When the amount of NOx absorbed by the NOx absorbent reaches the limit of its NOx absorbing capacity, i.e., the maximum NOx absorbing amount, the NOx absorbent cannot absorb NOx any more. Accordingly, to discharge the absorbed NOx and reduce it at an appropriate timing, the air-fuel ratio is enriched, that is, reduction enrichment of the air-fuel ratio is performed.

A proportional type air-fuel ratio sensor (which will be hereinafter referred to as "LAF sensor") 17 is mounted on the exhaust pipe 13 at a position upstream of the three-way catalyst 14. The LAF sensor 17 outputs an electrical signal substantially proportional to the oxygen concentration (air-fuel ratio) in the exhaust gases, and supplies the electrical signal to the ECU 5.

A binary type oxygen concentration sensor (which will be hereinafter referred to as "O2 sensor") 18 is mounted on the exhaust pipe 13 at a position between the three-way catalyst 14 and the NOx removing device 15, and an O2 sensor 19 is mounted on the exhaust pipe 13 at a position downstream of the NOx removing device 15. Detection signals from these sensors 18 and 19 are supplied to the ECU 5. Each of the O2 sensors 18 and 19 has a characteristic such that its output rapidly changes in the vicinity of the stoichiometric ratio. More specifically, the output from each of the sensors 18 and 19 has a high level in a rich region with respect to the stoichiometric ratio, and outputs a low level signal in a lean region with respect to the stoichiometric ratio.

The engine 1 has a valve timing switching mechanism 30 capable of switching the valve timing of intake valves and exhaust valves between a high-speed valve timing suitable for a high-speed operating region of the engine 1 and a low-speed valve timing suitable for a low-speed operating region of the engine 1. This switching of the valve timing also includes switching of a valve lift amount. Further, when selecting the low-speed valve timing, one of the two intake valves in each cylinder is stopped to ensure stable combustion even in the case of setting the air-fuel ratio lean with respect to the stoichiometric ratio.

The valve timing switching mechanism 30 is of such a type that the switching of the valve timing is carried out hydraulically. That is, a solenoid valve for performing the hydraulic switching and an oil pressure sensor are connected to the ECU 5. A detection signal from the oil pressure sensor is supplied to the ECU 5, and the ECU 5 controls the solenoid valve to perform the switching control of the valve timing according to an operating condition of the engine 1.

The ECU 5 includes an input circuit 5a having various functions including a function of shaping the waveforms of input signals from the various sensors, a function of correcting the voltage levels of the input signals to a predetermined level, and a function of converting analog signal values into digital signal values, a central processing unit (which will be hereinafter referred to as "CPU") 5b, storage means 5c for preliminarily storing various operational programs to be executed by the CPU 5b and for storing the results of computation or the like by the CPU 5b, and an output circuit 5d for supplying drive signals to the fuel injection valves 6.

The CPU 5b determines various engine operating conditions according to various engine operating parameter signals as mentioned above, and calculates a fuel injection period TOUT of each fuel injection valve 6 to be opened in synchronism with the TDC signal pulse, in accordance with Eq. (1) according to the above determined engine operating conditions.

$$TOUT = TiM \times KCMD \times KLAF \times K1 + K2 \qquad (1)$$

TiM is a basic fuel injection amount of each fuel injection valve 6, more specifically, a basic fuel injection period of each fuel injection valve 6, and it is determined by searching a Ti map set according to the engine rotational speed NE and the absolute intake pressure PBA. The Ti map is set so that the air-fuel ratio of an air-fuel mixture to be supplied to the engine 1 becomes substantially equal to the stoichiometric ratio in an operating condition according to the engine rotational speed NE and the absolute intake pressure PBA.

KCMD is a target air-fuel ratio coefficient, which is set according to engine operating parameters such as the engine rotational speed NE, the throttle valve opening θTH, and the engine coolant temperature TW. The target air-fuel ratio coefficient KCMD is proportional to the reciprocal of an air-fuel ratio A/F, i.e., proportional to a fuel-air ratio F/A, and takes a value of 1.0 for the stoichiometric ratio, so KCMD is referred to also as a target equivalent ratio. Further, in the case of executing reduction enrichment (to be hereinafter described), the target air-fuel ratio coefficient KCMD is set to a predetermined enrichment value KCMDR for enrichment of an air-fuel ratio.

KLAF is an air-fuel ratio correction coefficient calculated by PID control so that a detected equivalent ratio KACT calculated from a detected value from the LAF sensor 17 becomes equal to the target equivalent ratio KCMD in the case that the conditions for execution of feedback control are satisfied.

K1 and K2 are another correction coefficient and correction variable computed according to various engine parameter signals, respectively. The correction coefficient K1 and correction variable K2 are determined to predetermined values to optimize various characteristics such as fuel consumption characteristics and engine acceleration characteristics according to engine operating conditions.

The CPU 5b supplies a drive signal for opening each fuel injection valve 6 according to the fuel injection period TOUT obtained above through the output circuit 5d to the fuel injection valve 6.

Figure 2:
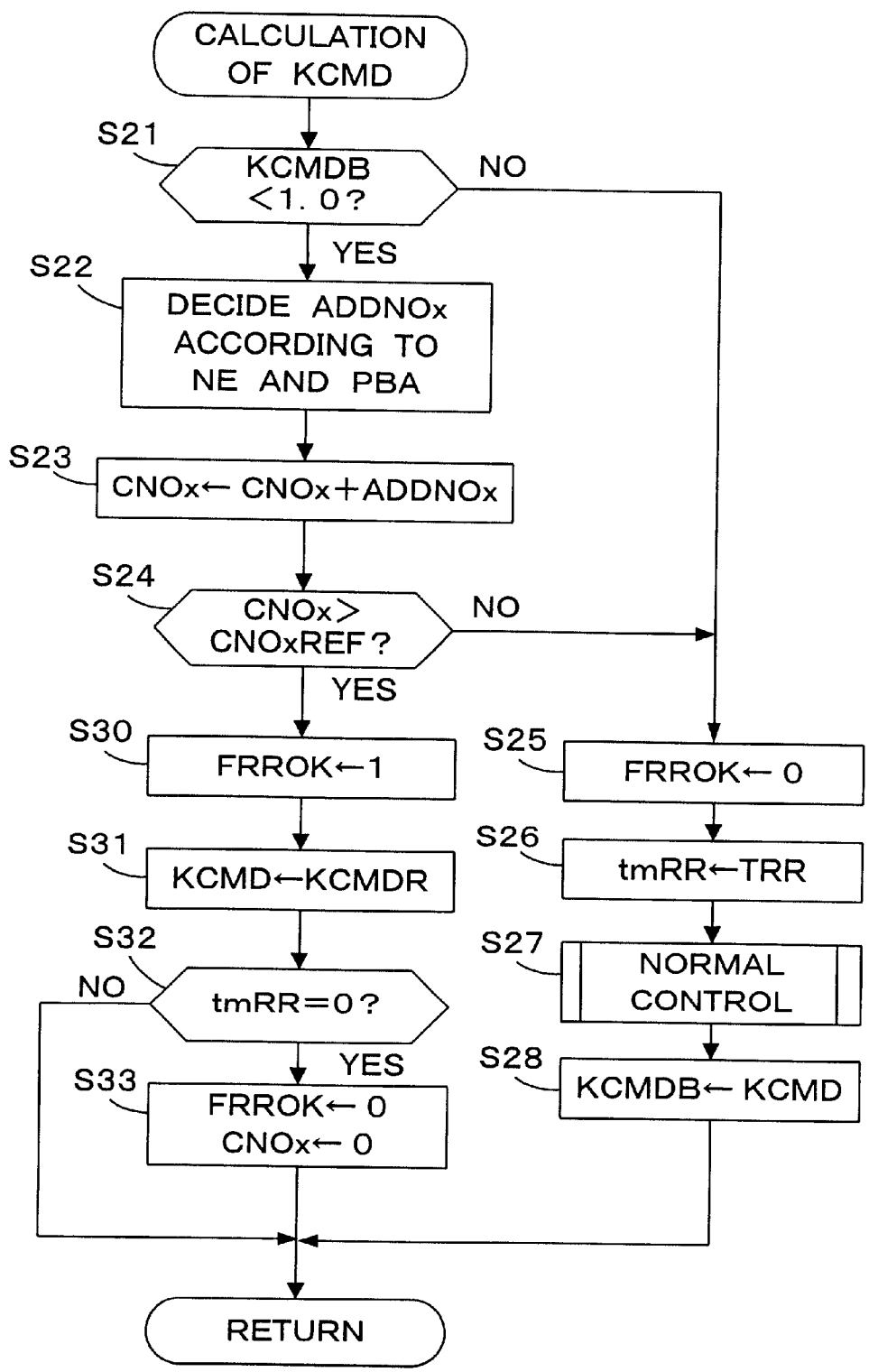
FIG. 2 is a flowchart showing a program for calculating a target air-fuel ratio coefficient (KCMD)

FIG. 2 is a flowchart showing a program for calculating the target air-fuel ratio coefficient KCMD applied to Eq. (1) mentioned above. This program is executed by the CPU 5b at predetermined time intervals.

In step S21, it is determined whether or not the engine 1 is in a lean operating condition, that is, whether or not a stored value KCMDB of the target air-fuel ratio coefficient KCMD stored in step S28 (to be hereinafter described) during normal control is smaller than "1.0". If KCMDB≧1.0, that is, if the engine 1 is not in the lean operating condition, the program proceeds directly to step S25, in which an enrichment flag FRROK indicating the duration of execution of reduction enrichment by "1" is set to "0". Thereafter, a reduction enrichment time TRR (e.g., 5 to 10 sec) is set to a downcount timer tmRR to be referred in step S32 (to be hereinafter described), and the timer tmRR is started (step S26). Then, normal control is performed to set the target air-fuel ratio coefficient KCMD according to engine operating conditions (step S27). Basically, the target air-fuel ratio coefficient KCMD is calculated according to the engine rotational speed NE and the absolute intake pressure PBA. In the condition where the engine coolant temperature TW is low or in a predetermined high-load operating condition, the set value of the target air-fuel ratio coefficient KCMD is changed according to these conditions. Then, the target air-fuel ratio coefficient KCMD calculated in step S27 is stored as a stored value KCMDB (step S28), and this program is ended.

If KCMDB<1.0 in step S21, that is, if the engine 1 is in the lean operating condition, an increment value ADDNOx to be used in step S23 is decided according to the engine rotational speed NE and the absolute intake pressure PBA (step S22). The increment value ADDNOx is a parameter corresponding to the amount of NOx exhausted per unit time during the lean operation, and this parameter ADDNOx is set so that it increases with an increase in the engine rotational speed NE and with an increase in the absolute intake pressure PBA.

In step S23, the increment value ADDNOx decided in step S22 is applied to the following expression to increment an NOx amount counter CNOx, thereby obtaining an NOx exhaust amount, that is, a count value corresponding to the amount of NOx absorbed by the NOx absorbent.

$$CNOx = CNOx + ADDNOx$$

In step S24, it is determined whether or not the current value of the NOx amount counter CNOx has exceeded an allowable value CNOxREF. If the answer to step S24 is negative (NO), the program proceeds to step S25, in which the normal control is performed, that is, the target air-fuel ratio coefficient KCMD is set according to engine operating conditions. The allowable value CNOxREF is set to a value corresponding to an NOx amount slightly smaller than the maximum NOx absorption amount of the NOx absorbent.

If CNOx>CNOxREF in step S24, the enrichment flag FRROK is set to "1" (step S30), and the target air-fuel ratio coefficient KCMD is set to a predetermined enrichment value KCMDR corresponding to a value equivalent to an air-fuel ratio of 14.0, thus executing reduction enrichment (step S31). Then, it is determined whether or not the current value of the timer tmRR is "0" (step S32). If tmRR>0, this program is ended at once, whereas if tmRR=0, the enrichment flag FRROK is set to "0" and the current value of the NOx amount counter CNOx is reset to "0" (step S33). Accordingly, the answer to step S24 in the next cycle becomes negative (NO), so that the normal control is then performed.

Figure 3:
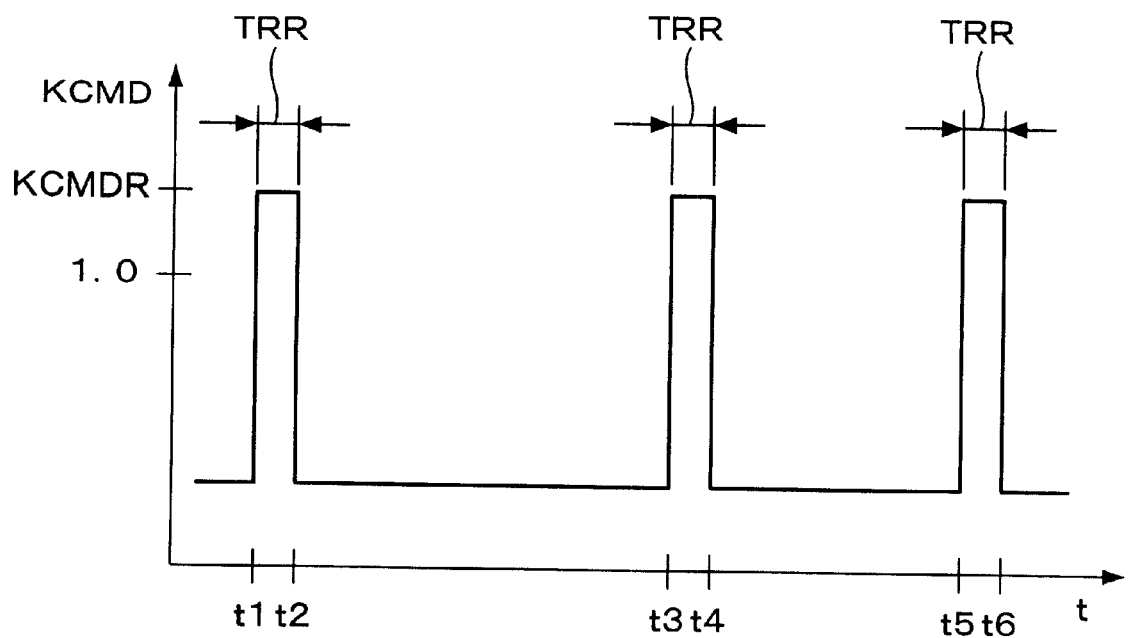
FIG. 3 is a time chart for illustrating the setting of the target air-fuel ratio coefficient during a lean operation.

According to the processing shown in FIG. 2, the reduction enrichment is executed intermittently as shown in FIG. 3 (during a time period between t1 and t2, a time period between t3 and t4, and a time period between t5 and t6) in an engine operating condition where the lean operation is permitted, so that NOx absorbed by the NOx absorbent in the NOx removing device 15 is discharged at an appropriate timing.

Figure 4:
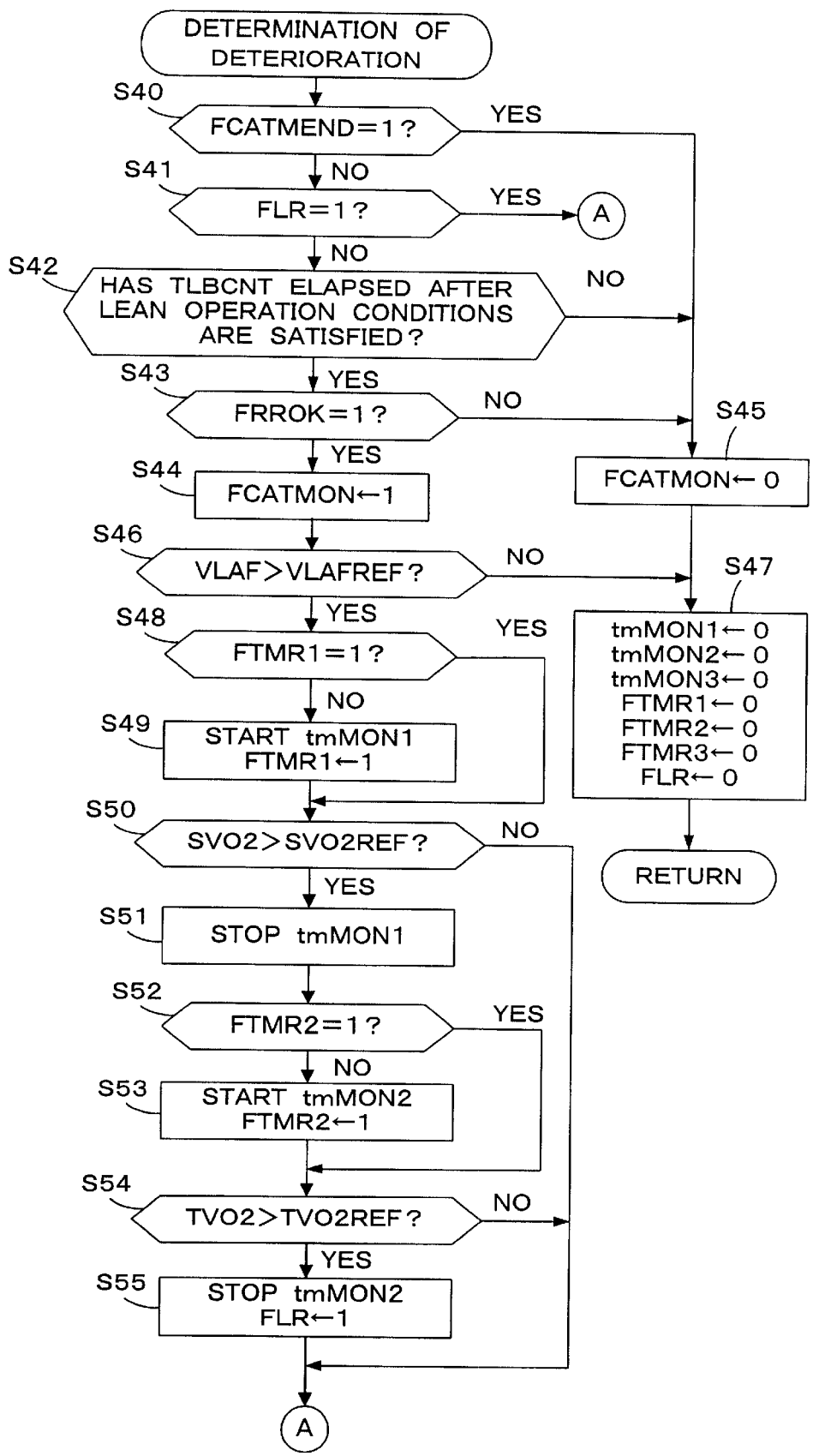
FIGS. 4 and 5 are flowcharts showing a program for determining deterioration of a three-way catalyst and an NOx removing device.
Figure 5:
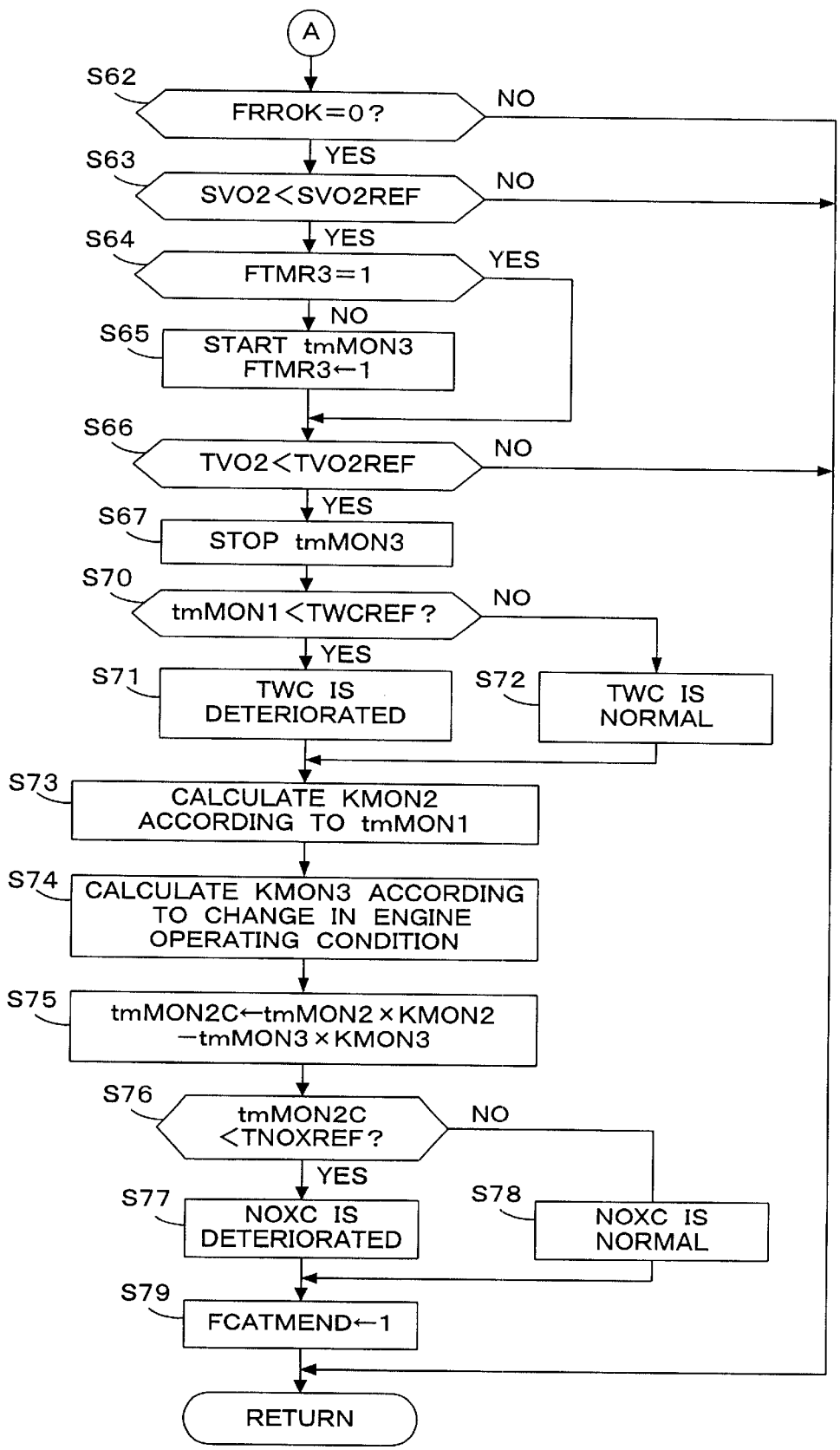

FIGS. 4 and 5 are flowcharts showing a program for determining deterioration of the three-way catalyst 14 and the NOx removing device 15. This program is executed at predetermined time intervals (e.g., 10 msec).

In step S40, it is determined whether or not an end flag FCATMEND indicating the end of determination of deterioration by "1" is "1". If FCATMEND=1, that is, if the determination of deterioration has already been ended, the program proceeds to step S45. If FCATMEND=0, that is, if the determination of deterioration has not been ended, it is determined whether or not a measurement end flag FLR indicating the end of measurement with a second upcount timer tmMON2 (to be hereinafter described) by "1" is "1" (step S41). If FLR=1, the program proceeds directly to step S62 (see FIG. 5).

If FLR=0 in step S41, it is determined whether or not a predetermined time period TLBCNT has elapsed after the conditions for execution of the lean operation are satisfied (step S42). If TLBCNT has not elapsed, the program proceeds to step S45, whereas if TLBCNT has elapsed, it is determined whether or not the enrichment flag FRROK is "1" (step S43). If FRROK=0, that is, if the reduction enrichment is not executed, the program proceeds to step S45. In step S45, a deterioration monitor flag FCATMON is set to "0". Thereafter, a first upcount timer tmMON1, a second upcount timer tmMON2, and a third upcount timer tmMON3 each for the determination of deterioration are all set to "0", and first, second, and third timer operation flags FTMR1, FTMR2, and FTMR3 respectively indicating the start of measurement with the first, second, and third upcount timers tmMON1, tmMON2, and tmMON3 by "1" are all set to "0". Furthermore, the measurement end flag FLR is also set to "0" (step S47). Then, this program is ended.

If FRROK=1 in step S43, that is, if the reduction enrichment is being executed, the deterioration monitor flag FCATMON is set to "1" (step S44), and it is determined whether or not an output VLAF from the LAF sensor 17 is higher than a predetermined output value VLAFREF (e.g., a value corresponding to the stoichiometric ratio) (this condition indicating that the air-fuel ratio is in a rich region) (step S46). If VLAF≦VLAFREF, the program proceeds to step S47, whereas if VLAF>VLAFREF, the program proceeds to step S48, in which it is determined whether or not the first timer operation flag FTMR1 is "1". Since FTMR1=0 at first, the first timer tmMON1 is started and the first timer operation flag FTMR1 is set to "1" (step S49). Then, the program proceeds to step S50. In the subsequent cycles, FTMR1=1 holds in step S48, so that the program proceeds from step S48 directly to step S50.

In step S50, it is determined whether or not an output SVO2 from the O2 sensor 18 is higher than a predetermined output value SVO2REF slightly higher than a value corresponding to the stoichiometric ratio. At first, the effect of the air-fuel ratio enrichment does not appear on the downstream side of the three-way catalyst 14, so that SVO2≦SVO2REF holds and the program proceeds directly to step S62, in which it is determined whether or not the enrichment flag FRROK is "0". If FRROK=1 in step S62, that is, if the reduction enrichment is being executed, this program is ended.

If SVO2>SVO2REF in step S50, the timer tmMON1 is stopped (step S51), and it is determined whether or not the second timer operation flag FTMR2 is "1" (step S52). Since FTMR2=0 holds at first, the second timer tmMON2 is started and the second timer operation flag FTMR2 is set to "1" (step S53). Then, the program proceeds to step S54. In the subsequent cycles, FTMR2=1 holds in step S52, so that the program proceeds from step S52 directly to step S54.

In step S54, it is determined whether or not an output TVO2 from the O2 sensor 19 is higher than a predetermined output value TVO2REF slightly higher than a value corresponding to the stoichiometric ratio. In the first cycle, the effect of the air-fuel ratio enrichment does not appear on the downstream side of the NOx removing device 15, so that TVO2≦TVO2REF holds and the program proceeds directly to step S62, in which it is determined whether or not the enrichment flag FRROK is "0". If FRROK=1 in step S62, that is, if the reduction enrichment is being executed, this program is ended.

If TVO2>TVO2REF in step S54, the timer tmMON2 is stopped and the measurement end flag FLR is set to "1" (step S55). Then, the program proceeds to step S62 and is subsequently ended.

After the measurement end flag FLR is set to "1", the flow from step S41 directly to step S62 is repeated to wait for the end of the reduction enrichment. When the reduction enrichment is ended, that is, when the target air-fuel ratio coefficient KCMD is changed from the predetermined enrichment value KCMDR to a value (<1.0) corresponding to a lean air-fuel ratio, FRROK=0 holds in step S62. Accordingly, the program proceeds from step S62 to step S63, in which it is determined whether or not the output SVO2 from the O2 sensor 18 is lower than the predetermined output value SVO2REF. If SVO2≦SVO2REF, this program is ended, whereas if SVO2<SVO2REF, it is determined whether or not the third timer operation flag FTMR3 is "1" (step S64). Since FTMR3=0 holds at first, the third timer tmMON3 is started and the third timer operation flag FTMR3 is set to "1" (step S65). Then, the program proceeds to step S66. In the subsequent cycles, FTMR3=1 holds in step S64, so that the program proceeds from step S64 directly to step S66.

In step S66, it is determined whether or not the output TVO2 from the O2 sensor 19 is lower than the predetermined output value TVO2REF. If TVO2<TVO2REF, this program is ended, whereas if TVO2<TVO2REF, the third timer tmMON3 is stopped (step S67), and it is determined whether or not the current value of the first timer tmMON1 is smaller than a first criterion time TWCREF (step S70).

The smaller value of the timer tmMON1 indicates that the three-way catalyst 14 is more deteriorated. That is, as the value of the timer tmMON1 becomes smaller, the degree of deterioration of the three-way catalyst 14 becomes higher. Accordingly, if tmMON1≦TWCREF, it is determined that the three-way catalyst 14 is normal (step S72), whereas if tmMON1<TWCREF, it is determined that the three-way catalyst 14 is deteriorated (step S71). Then, the program proceeds to step S73.

Figure 6:
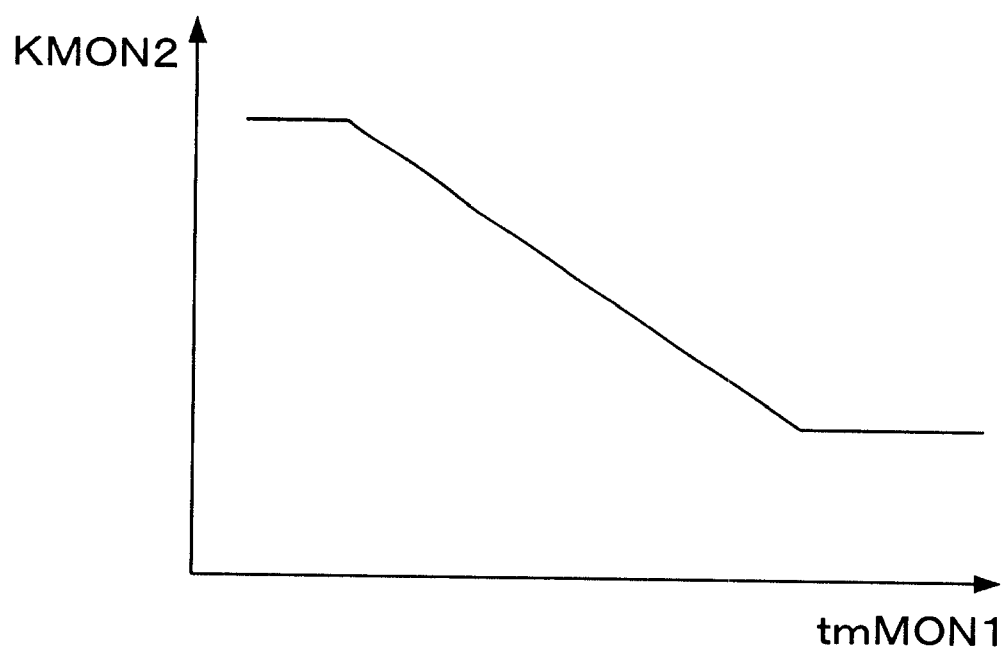
FIG. 6 is a graph showing a table used in the processing shown in FIG. 5.

In step S73, a KMON2 table shown in FIG. 6 is retrieved according to the current value of the first timer tmMON1 to calculate a three-way catalyst correction coefficient KMON2. The KMON2 table is set so that the three-way catalyst correction coefficient KMON2 increases with a decrease in the value of the first timer tmMON1, that is, with an increase in the degree of deterioration of the three-way catalyst 14. In step S74, an operating condition correction coefficient KMON3 is calculated according to a change in engine operating condition during a period from the time of starting the previous reduction enrichment to the current time, more specifically, according to a difference DNE in the engine rotational speed NE and a difference DPBA in the absolute intake pressure PBA during this period In step S75, a corrected timer value tmMON2C is calculated in accordance with Eq. (2).

$$tmMON2C = tmMON2 \times KMON2 - tmMON3 \times KMON3 \quad (2)$$

The smaller current value of the second timer tmMON2 indicates that the degree of deterioration of the NOx removing device 15 becomes higher. However, the current value of the second timer tmMON2 varies with the degree of deterioration of the three-way catalyst 14. Accordingly, the influence of the degree of deterioration of the three-way catalyst 14 is removed by multiplying the three-way catalyst correction coefficient KMON2 according to the degree of deterioration of the three-way catalyst 14 by the current value of the second timer tmMON2. Furthermore, the current values of the second and third timers tmMON2 and tmMON3 include a deviation due to variations in response characteristics (response time) of the O2 sensors 18 and 19 and a time period required for the travel of exhaust gases from the O2 sensor 18 to the O2 sensor 19. The deviation due to variations in response characteristics of the O2 sensors 18 and 19 included in the two timer values is considered to be substantially constant in a short time period of measurement of tmMON2 and tmMON3. However, the time period required for the travel of exhaust gases from the O2 sensor 18 to the O2 sensor 19 depends on the flow velocity of exhaust gases, so that this time period is considered to vary in response to a change in engine operating condition. Accordingly, the current value of the third timer tmMON3 is corrected by multiplying it by the operating condition correction coefficient KMON3, and the corrected timer value (=tmMON3×KMON3) is subtracted from the first term in the right side of Eq. (2), thereby eliminating the influence of variations in response characteristics of the O2 sensors 18 and 19 and the influence of the travel time of the exhaust gases as mentioned above to enable more accurate determination of deterioration.

It is experimentally confirmed that the time period measured by the timer tmMON3 is not largely dependent on the degree of deterioration of the NOx removing device 15, but mainly reflects variations in delay characteristics (response characteristics) of the O2 sensors 18 and 19.

In step S76, it is determined whether or not the corrected timer value tmMON2C is less than a second criterion time TNOXREF. The smaller value of the second timer tmMON2 indicates that the NOx removing device 15 is more deteriorated. Accordingly, if tmMON2C≦TNOXREF, it is determined that the NOx removing device 15 is normal (step S78), whereas if tmMON2C<TNOXREF, it is determined that the NOx removing device 15 is deteriorated (step S77). Then, the end flag FCATMEND is set to "1" (step S79), and this program is ended.

The first criterion time TWCREF is experimentally decided so as to correspond to a delay time period when the oxygen storing capacity of the three-way catalyst 14 is decreased to about 50% of that of a new one, for example, and the second criterion time TNOXREF is experimentally decided so as to correspond to a delay time period in the condition where the NOx absorbing capacity of the NOx absorbent has become almost zero because of thermal deterioration (in a completely thermal-deteriorated condition). The corrected timer value tmMON2C decreases sequentially from a condition of a new NOx removing device through a condition after 50-kilomile running and a sulfur-poisoned condition of the NOx absorbent to the completely thermal-deteriorated condition in this order. Accordingly, the second criterion time TNOXREF may be set to a longer time, so as to determine the condition after 50-kilomile running or the sulfur-poisoned condition.

Figure 7A:
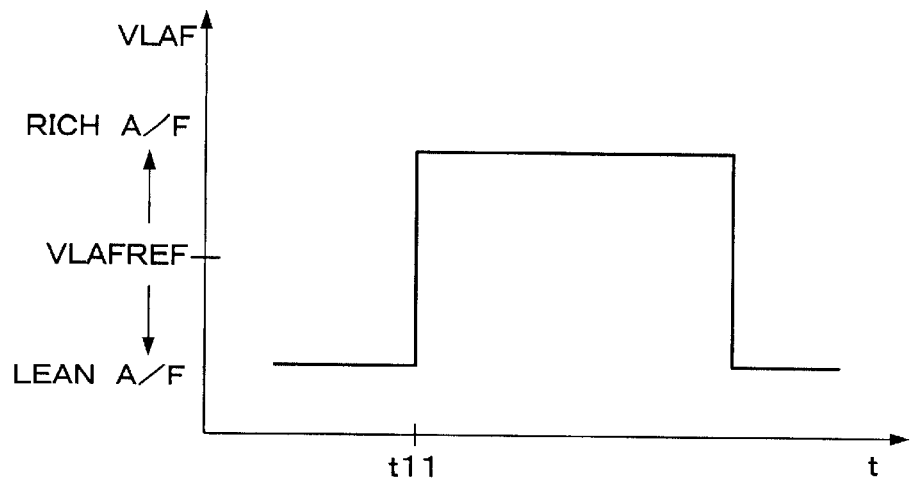
FIGS. 7A, 7B, and 7C are time charts for illustrating changes in output values from oxygen concentration sensors and delay time periods (TMON1, TMON2, and TMON3).
Figure 7B:
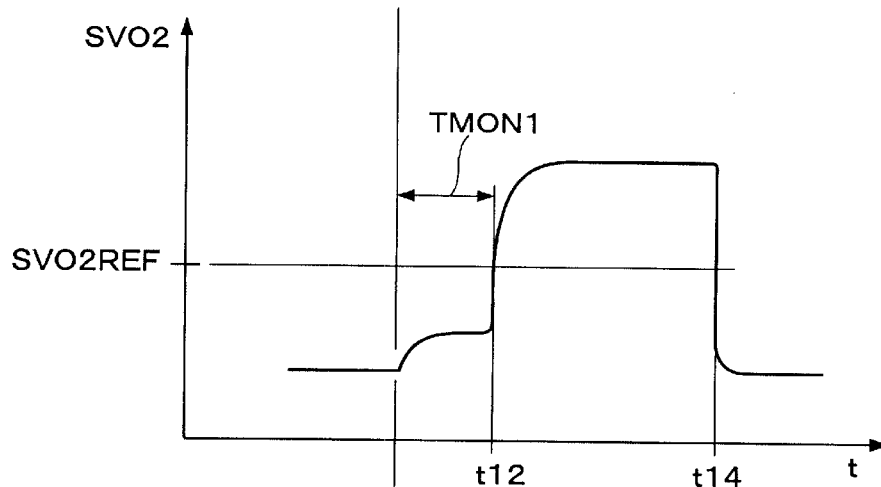
Figure 7C:
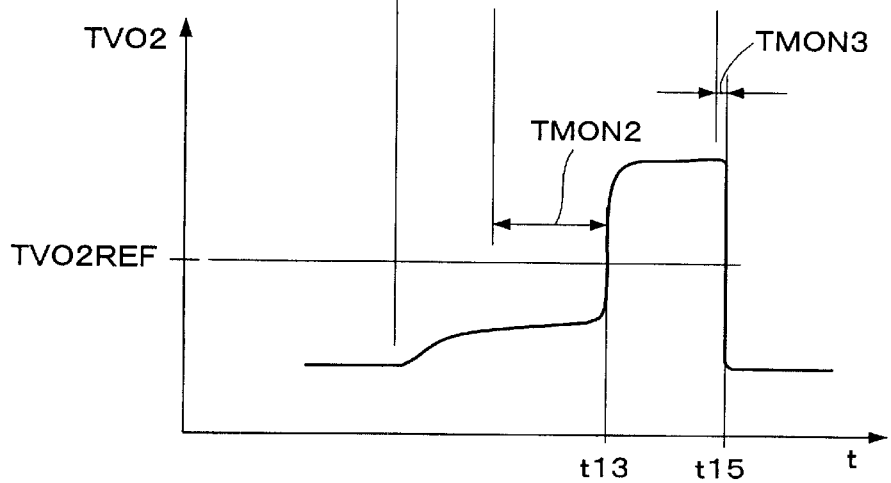

According to the processing shown in FIGS. 4 and 5, in performing the reduction enrichment (in changing the air-fuel ratio from a lean air-fuel ratio to a rich air-fuel ratio) after the predetermined time period TLBCNT has elapsed from the beginning of the lean operation to make the NOx absorbent to absorb NOx in an amount allowing the detection of deterioration, a first delay time period TMON1, a second delay time period TMON2, and third delay time period TMON3 are measured as shown in FIGS. 7A to 7C. The first timer tmMON1 measures the first delay time period TMON1 from the time till when the output VLAF from the LAF sensor 17 provided upstream of the three-way catalyst 14 has become higher than the predetermined output value VLAFREF to the time t12 when the output SVO2 from the O2 sensor 18 provided downstream of the three-way catalyst 14 becomes higher than the predetermined output value SVO2REF. The second timer tmMON2 next measures the second delay time period TMON2 from the time t12 when the output SVO2 from the O2 sensor 18 has become higher than the predetermined output value SVO2REF to the time t13 when the output TVO2 from the O2 sensor 19 provided downstream of the NOx removing device 15 becomes higher than the predetermined output value TVO2REF. Further, in ending the reduction enrichment (in changing the air-fuel ratio from the rich air-fuel ratio to the lean air-fuel ratio), the third timer tmMON3 measures the third delay time period TMON3 from the time t14 when the output SVO2 from the O2 sensor 18 has become lower than the predetermined output value SVO2REF to the time t15 when the output TVO2 from the O2 sensor 19 becomes lower than the predetermined output value TVO2REF.

In the case that the criterion of deterioration is set so that it may be determined whether or not the NOx absorbing capacity of the NOx absorbent has become almost zero, the amount of NOx absorbed by the NOx absorbent that allows the detection of deterioration is defined as a NOx amount not less than an absorbable NOx amount in such a condition that the NOx absorbing power has become almost zero. In the case that the criterion of deterioration is set so that it may determined whether or not the NOx absorbing capacity has become about 50% of that of a new absorbent, the amount of NOx absorbed by the NOx absorbent that allows the detection of deterioration is defined as a NOx amount not less than 50% of the maximum absorption amount.

The first delay time period TMON1 is a parameter indicating the degree of deterioration of the three-way catalyst 14. The second delay time period TMON2 corresponds to the time required for discharge of the whole NOx absorbed by the NOx absorbent, and it indicates the NOx absorbing capacity of the NOx absorbent. That is, the shorter second delay time period TMON2 indicates that the NOx absorbing capacity becomes lower. Accordingly, by using the second delay time period, the determination of deterioration of the NOx removing device 15 can be performed. However, the second delay time period TMON2 changes according to the degree of deterioration of the three-way catalyst 14 provided upstream of the NOx removing device 15. More specifically, as the degree of deterioration of the three-way catalyst 14 becomes higher, the timing of decreasing the oxygen concentration on the downstream side of the three-way catalyst 14 becomes earlier, and the concentrations of HC and CO having a reducing function becomes larger. Accordingly, although the amount of NOx absorbed by the NOx absorbent is fixed, the time required for reduction of the absorbed NOx, i.e., the second delay time period TMON2, becomes shorter. In consideration of this fact, the timer value tmMON2 (=the second delay time period TMON2) is corrected by the three-way catalyst correction coefficient KMON2, and when the corrected timer value tmMON2C becomes lower than the criterion time TNOXREF, it is determined that the NOx absorbent has been deteriorated. Therefore, the determination of deterioration of the NOx removing device 15 can be accurately performed irrespective of the degree of deterioration of the three-way catalyst 14.

Further, according to this preferred embodiment, the third delay time period TMON3 is corrected by the operating condition correction coefficient KMON3 according to a change in engine operating condition (a change during the time period from the time t13 to the time t15), and the corrected third delay time period TMON3 corrected is subtracted from the second delay time period TMON2 after correction by the three-way catalyst correction coefficient KMON2. Accordingly, the influence of variations in response characteristics of the O2 sensors 18 and 19 can be eliminated to thereby effect more accurate determination of deterioration.

Thus, the second delay time period TMON2 is corrected according to the degree of deterioration of the three-way catalyst 14 provided upstream of the NOx removing device 15, and the corrected second delay time period TMON2 is further corrected by the third delay time period TMON3 to obtain a corrected delay time period (tmMON2C). Then, the deterioration of the NOx removing device 15 is determined by this corrected delay time period. Accordingly, the determination of deterioration of the NOx removing device 15 can be accurately performed regardless of the degree of deterioration of the three-way catalyst 14 and the influence of variations in characteristics of the O2 sensors 18 and 19.

Various modifications may be made to the embodiment described above. For example, while the determination of deterioration is performed by using measured values obtained by measuring the first, second, and third delay time periods TMON1, TMON2, and TMON3 one time in the above preferred embodiment, the measurement of the first, second, and third delay time periods TMON1, TMON2, and TMON3 may be made plural times, e.g., about ten times, and the average of measured values obtained by a plurality of measurements may be used to perform the determination.

The method of determining the degree of deterioration of the three-way catalyst 14 may be replaced by another known method as described in Japanese Patent Laid-open No. 6-212955, for example.

While the second delay time period TMON2 (tmMON2) is corrected according to the degree of deterioration of the three-way catalyst 14 in the above preferred embodiment, the second criterion time period TNOXREF may be corrected according to the degree of deterioration of the three-way catalyst 14. In this case, the correction of the second criterion time period TNOXREF is made so that it is decreased with an increase in the degree of deterioration of the three-way catalyst.

In the case of changing the predetermined enrichment value KCMDR used in the execution of reduction enrichment according to an engine operating condition, the delay time periods TMON1 and TMON2 are influenced by the value KCMDR, so that the criterion time periods TWCREF and TNOXREF used for the determination of deterioration are preferably set so that they are decreased with an increase in the value KCMDR.

Further, while the proportional type air-fuel ratio sensor (oxygen concentration sensor) 17 is provided upstream of the three-way catalyst 14, and the binary type oxygen concentration sensors 18 and 19 are provided upstream and downstream of the NOx removing device 15, respectively, in the above preferred embodiment, the type and arrangement of each oxygen concentration sensor is not limited to the above. For example, all of the oxygen concentration sensors may be of either the proportional type or the binary type.

Further, while the above preferred embodiment is applied to an exhaust emission control system including a three-way catalyst, the present invention is applicable also to an exhaust emission control system not including a three-way catalyst.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. An exhaust emission control system for an exhaust system for an internal combustion engine, having a nitrogen oxide removing means for absorbing nitrogen oxides contained in exhaust gases in an exhaust lean condition and reducing the absorbed nitrogen oxides in an exhaust rich condition, said control system comprising;

a first oxygen concentration sensor provided upstream of said nitrogen oxide removing means for detecting the oxygen concentration in the exhaust gases;

a second oxygen concentration sensor provided downstream of said nitrogen oxide removing means for detecting the oxygen concentration in the exhaust gases;

first measuring means for measuring a first response delay time period from the time when the output value from said first oxygen concentration sensor has changed to a value indicative of a rich air-fuel ratio, to the time when the output value from said second oxygen concentration sensor becomes a value indicative of a rich air-fuel ratio, after changing the air-fuel ratio of the air-fuel mixture to be supplied to the engine from a lean region to a rich region with respect to a stoichiometric ratio;

second measuring means for measuring a second response delay time period from the time when the output value from said first oxygen concentration sensor has changed to a value indicative of a lean air-fuel ratio, to the time when the output value from said second oxygen concentration sensor becomes a value indicative of a lean air-fuel ratio, after changing the air-fuel ratio from the rich region to the lean region with respect to the stoichiometric ratio; and deterioration determining means for determining deterioration of said nitrogen oxide removing means according to the first and second response delay time periods, wherein said deterioration determining means includes correcting means for correcting the first response delay time period according to the second response delay time period, and determines the deterioration according to the first response delay time period corrected by said correcting means.

2. An exhaust emission control system according to claim 1, wherein said correcting means calculates a correction coefficient according to a change in the operating condition of said engine during a period from the time of measurement of the first response delay time period to the time of measurement of the second response delay time period, corrects the second response delay time period by using the correction coefficient, and corrects the first response delay time period by using the corrected second response delay time period.

3. An exhaust emission control system according to claim 1, wherein said deterioration determining means calculates a first average value from a plurality of measured values of the first response delay time period and a second average value from a plurality of measured values of the second response delay time period, and determines the deterioration of said nitrogen oxide removing means according to the first and second average values.

4. An exhaust emission control system for an exhaust system for an internal combustion engine, having a nitrogen oxide removing means for absorbing nitrogen oxides contained in exhaust gases in an exhaust lean condition and reducing the absorbed nitrogen oxides in an exhaust rich condition, said control system comprising;

a first oxygen concentration sensor provided upstream of said nitrogen oxide removing means for detecting the oxygen concentration in the exhaust gases;

a second oxygen concentration sensor provided downstream of said nitrogen oxide removing means for detecting the oxygen concentration in the exhaust gases;

first measuring means for measuring a first response delay time period from the time when the output value from said first oxygen concentration sensor has changed to a value indicative of a rich air-fuel ratio, to the time when the output value from said second oxygen concentration sensor becomes a value indicative of a rich air-fuel ratio, after changing the air-fuel ratio of the air-fuel mixture to be supplied to the engine from a lean region to a rich region with respect to a stoichiometric ratio;

second measuring means for measuring a second response delay time period from the time when the output value from said first oxygen concentration sensor has changed to a value indicative of a lean air-fuel ratio, to the time when the output value from said second oxygen concentration sensor becomes a value indicative of a lean air-fuel ratio, after changing the air-fuel ratio from the rich region to the lean region with respect to the stoichiometric ratio; and deterioration determining means for determining deterioration of said nitrogen oxide removing means according to the first and second response delay time periods, further including a three-way catalyst provided upstream of said first oxygen concentration sensor, and three-way catalyst deterioration determining means for determining the deterioration of said three-way catalyst, wherein said deterioration determining means determines the deterioration of said nitrogen oxide removing means according to the first and second response delay time periods and the degree of deterioration of said three-way catalyst.

5. An exhaust emission control system according to claim 4, further including a third oxygen concentration sensor provided upstream of said three-way catalyst, wherein said three-way catalyst deterioration determining means determines the degree of deterioration of said three-way catalyst according to the output value from said third oxygen concentration sensor and the output value from said first oxygen concentration sensor.

* * * * *